United States Patent
Gellerich et al.

(10) Patent No.: US 10,235,168 B2
(45) Date of Patent: Mar. 19, 2019

(54) LOAD REGISTER ON CONDITION IMMEDIATE OR IMMEDIATE INSTRUCTION

(71) Applicant: INTERNATIONAL BUSINESS MACHINES CORPORATION, Armonk, NY (US)

(72) Inventors: Wolfgang Gellerich, Boeblingen (DE); Martin Schwidefsky, Boeblingen (DE); Chung-Lung K. Shum, Wappingers Falls, NY (US); Kai Weber, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 15/008,684

(22) Filed: Jan. 28, 2016

(65) Prior Publication Data

US 2016/0139923 A1    May 19, 2016

Related U.S. Application Data

(62) Division of application No. 13/793,223, filed on Mar. 11, 2013, now Pat. No. 9,329,863.

(30) Foreign Application Priority Data

Mar. 13, 2012 (EP) .................................. 12159177

(51) Int. Cl.
    *G06F 9/30* (2006.01)
(52) U.S. Cl.
    CPC ...... *G06F 9/30029* (2013.01); *G06F 9/30018* (2013.01); *G06F 9/30021* (2013.01);
    (Continued)

(58) Field of Classification Search
None
See application file for complete search history.

(56) References Cited

U.S. PATENT DOCUMENTS 5,774,687 A    6/1998  Nakamura
7,631,025 B2  12/2009  Debes et al.
(Continued)

FOREIGN PATENT DOCUMENTS

EP    1879102 B1    5/2011

OTHER PUBLICATIONS

Office Action for U.S. Appl. No. 13/793,223 dated Aug. 24, 2015, pp. 1-16.
(Continued)

*Primary Examiner* — William B Partridge
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

A data processor comprising a plurality of registers, and instruction execution circuitry having an associated instruction set, wherein the instruction set includes an instruction specifying at least a mask operand, a register operand and an immediate value operand, and the instruction execution circuitry, in response to an instance of the instruction, determines a Boolean value based on the mask operand and sets a respective one of a plurality of registers specified by the register operand of the instance to a value of the immediate value operand if the Boolean value is true. The instruction execution circuitry, in response to the instance of the instruction, may set the respective one of the plurality of registers specified by the register operand of the instance to zero if the Boolean value is false.

15 Claims, 4 Drawing Sheets

(52) U.S. Cl.
CPC ...... *G06F 9/30043* (2013.01); *G06F 9/30072* (2013.01); *G06F 9/30094* (2013.01); *G06F 9/30098* (2013.01)

(56) References Cited

U.S. PATENT DOCUMENTS

| | | |
|---|---|---|
| 9,229,719 B2 | 1/2016 | Macy, Jr. et al. |
| 2002/0083305 A1 | 6/2002 | Renard |
| 2005/0027969 A1 | 2/2005 | Simon |
| 2008/0082795 A1 | 4/2008 | Kishore et al. |
| 2010/0306504 A1 | 12/2010 | McDonald |
| 2013/0246760 A1 | 9/2013 | Gellerich et al. |
| 2014/0372727 A1 | 12/2014 | Valentine et al. |

OTHER PUBLICATIONS

MC Dermott, "The Arm Instruction Set Architecture," Aug. 2008, UT ECE Department, pp. 1-85.

Bryant et al., "x86-64 Machine-Level Programming," Sep. 2005, pp. 1-46.

LOAD REGISTER ON CONDITION IMMEDIATE OR IMMEDIATE INSTRUCTION

CROSS-REFERENCE TO RELATED APPLICATIONS/PRIOR FOREIGN APPLICATION

This application is a divisional of U.S. Ser. No. 13/793,223, entitled "LOAD REGISTER ON CONDITION WITH ZERO OR IMMEDIATE INSTRUCTION," filed Mar. 11, 2013, which claims priority from European patent application number 12159177.0, filed Mar. 13, 2012, each of which is hereby incorporated herein by reference in its entirety.

BACKGROUND

One or more aspects of the present disclosure relates to a data processor, as well as to processing data in a data processor.

It is known to use data processors such as microprocessors for the processing of data, in particular data in binary representation. In order to meet given design objectives such as processing speed, processor cost, processor size and power consumption, typical data processors have a limited instruction set having on the order of 100 instructions or less and comprise processing hardware optimized to execute those instructions in conformity with the design objectives. Such execution of instructions often involves a manipulation of data stored in one or more registers of the data processor.

SUMMARY

Shortcomings of the prior art are overcome and additional advantages are provided through the provision of a data processor. The data processor includes, for instance, a plurality of registers; and instruction execution circuitry having an associated instruction set, wherein the instruction set includes an instruction specifying at least a mask operand, a register operand, and an immediate value operand; the instruction execution circuitry, based on an instance of the instruction, determines whether a condition code is set to a value indicated in the mask operand and sets a respective one of a plurality of registers specified by the register operand of the instance to a value of the immediate value operand based on the condition code being set to the value indicated in the mask operand.

Methods and computer program products relating to one or more aspects are also described and claimed herein.

Additional features and advantages are realized through the techniques described herein. Other embodiments and aspects are described in detail herein and are considered a part of the claimed aspects.

DETAILED DESCRIPTION

One aspect teaches a data processor whose instruction set includes at least one instruction belonging to a family of "load register on condition immediate" instructions, i.e. instructions that, subject to fulfillment of a condition (at least partially) specified by the respective instruction, effect a loading of an immediate value (at least partially) specified by the respective instruction into a register (at least partially) specified by the respective instruction when executed on the data processor.

Inter alia, one or more aspects teach a data processor that, in response to an instance of an instruction specifying a mask operand, a register operand and an immediate value operand, determines a Boolean value based on the mask operand and sets a respective one of a plurality of registers specified by the register operand of the instance to a value of the immediate value operand if the Boolean value is true.

Moreover, one or more aspects teach a data processor that, in response to an instance of an instruction specifying a mask operand, a register operand and an immediate value operand, determines a Boolean value based on the mask operand and sets a respective one of a plurality of registers specified by the register operand of the instance to a value of the immediate value operand if the Boolean value is true and to a value of zero if the Boolean value is false.

One or more aspects teach a data processor that, in response to an instance of an instruction specifying a mask operand, a register operand, an immediate value operand and another immediate value operand, determines a Boolean value based on the mask operand and sets a respective one of a plurality of registers specified by the register operand of the instance to a value of the immediate value operand if the Boolean value is true and to a value of the other immediate value operand if the Boolean value is false.

The teachings of one or more aspects provide new machine instructions that make programs shorter and faster. More specifically, the new instructions can be used in cases that previously required several instructions. There are code examples where the new instructions reduce the number of registers needed by one. In other cases, the new instructions eliminate one branch instruction, thus reducing pressure to the branch prediction logic and eliminating the risk to degrade performance due to a mispredicted branch. Tests with non-public implementations of the new instructions in the Linux compiler gcc on System z have demonstrated that (1) the new instructions are easily integrated into the code generation of today's compilers, and (2) that the new instructions can actually be exploited by the compiler. An evaluation using some of the SpecCPU 2006 performance test cases and with the Linux kernel sources suggests that the new instructions provide improvement in performance.

As touched upon supra, one or more aspects relate to a data processor, e.g. a microprocessor. The data processor may be embodied as an integrated circuit and may be formed of circuit structures with dimensions on the order of nanometers and/or micrometers. The data processor may comprise input/output circuitry for receiving and outputting data signals, e.g. data signals representative of binary data to be processed/that has been processed by the data processor.

The data processor may comprise a plurality of registers, e.g. for storing binary data as known in the art. The plurality of registers may comprise a plurality of data registers and/or a plurality of general purpose registers.

The data processor may comprise instruction execution circuitry. As known in the art, the instruction execution circuitry may comprise various specialized sub-circuits, e.g. may comprise circuitry for decoding instructions, circuitry for communicating data to and/or from one or more or all of the plurality of registers, one or more circuits for effecting mathematical computations such as addition, subtraction, multiplication and/or division on binary data and/or circuitry for performing branch prediction (with respect to one or more sequences of instructions). Such branch prediction may be based on one or more (intermediate) results of a data processing carried out by the data processor. The instruction execution circuitry may have a pipeline structure, e.g. to permit processing to be carried out at a given minimum frequency. The instruction execution circuitry may be communicatively connected to one or more or all of the registers. In other words, the instruction execution circuitry may read and/or write data to one or more or all of the registers.

Figure 1:
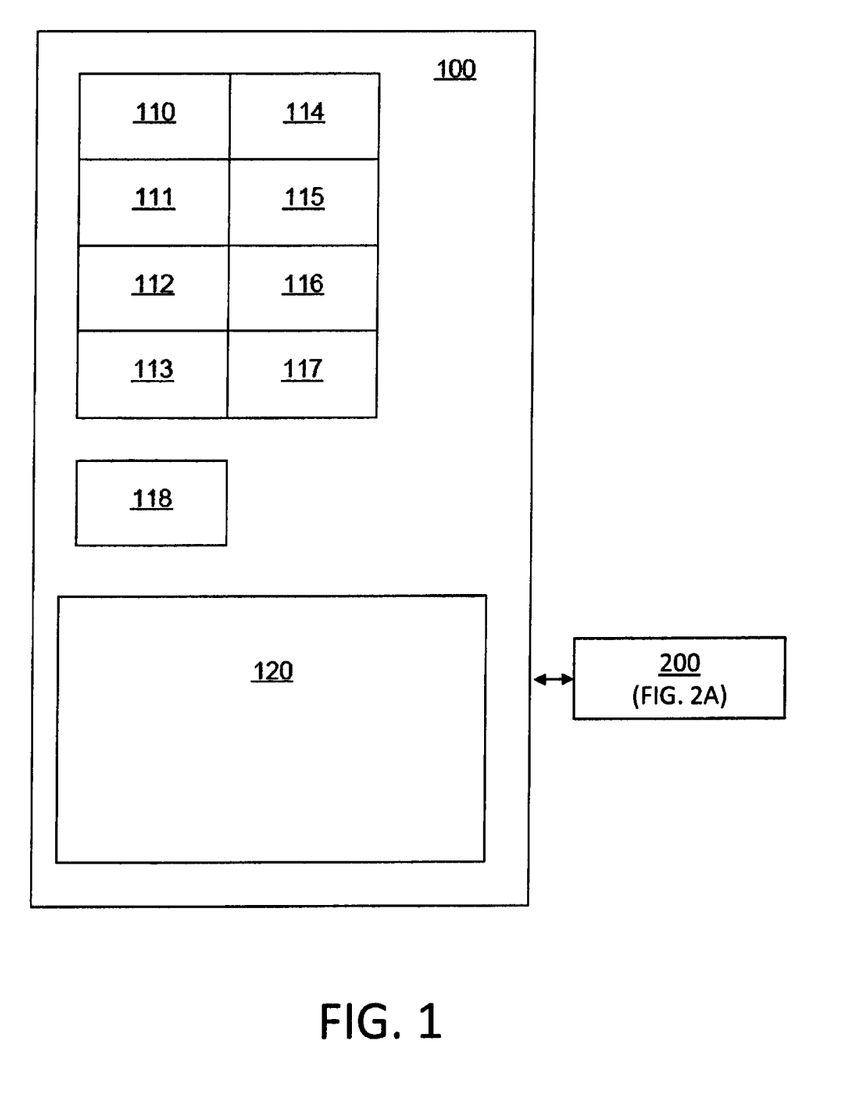
FIG. 1 schematically shows an embodiment of a data processor in accordance with one or more aspects.
Figure 2A:
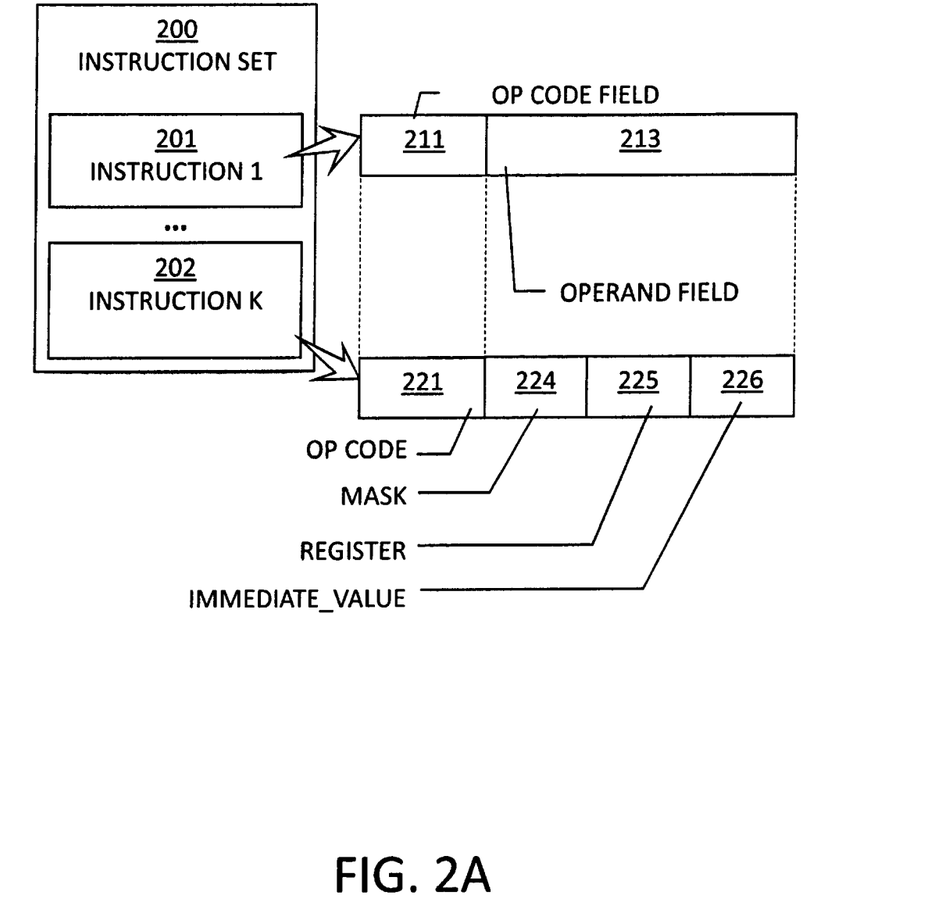
FIG. 2A depicts one example of an instruction set with example instructions.
Figure 2B:
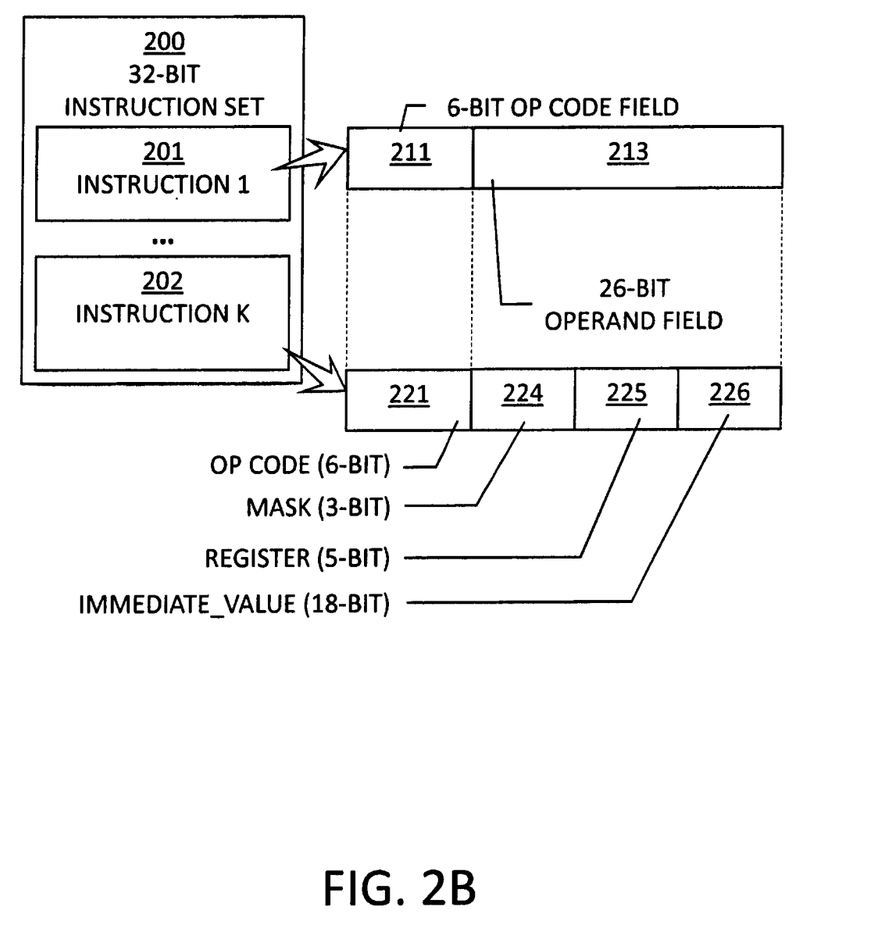
FIG. 2B depicts further details of an instruction of FIG. 2A.

The instruction execution circuitry 120 of FIG. 1 may have an associated instruction set 200 of FIGS. 2A, and 2B. For example, the instruction execution circuitry 120 may include hardware that performs data processing solely in response to instructions 201, 202 of FIGS. 1, 2A, and 2B belonging to the instruction set 200. Moreover, the instruction execution circuitry 120 may be configured to do nothing more than indicate an error if confronted with an instruction not belonging to the instruction set 200. Similarly, the instruction execution circuitry 120 may be hardwired and/or programmed to perform data operations and/or processor control operations (excepting indication of an error) solely in response to instructions 201, 202 belonging to the instruction set 200. In other words, the instruction set 200 may be an inherent feature of the instruction execution circuitry 120. For example, the instruction set 200 may be defined by the hardware and/or firmware of the data processor.

As used herein, the term "instruction" may be understood in two interrelated senses. In a first sense, the term "instruction" may designate a data structure, i.e. a "template" for an instance of an instruction (in the second sense). In this respect, each instruction 201, 202 of the instruction set 200 may specify that data/bits at a particular location of an instruction (in the second sense) are representative of a data/bit field referred to as an opcode 211 of FIGS. 2A and 2B. Each instruction 201 or 202 of the instruction set 200 may be associated with a respective opcode 211 or 221 that uniquely identifies the instruction 201 or 202 and, thus, the data structure. The opcode 211 or 221 may inherently specify a data processor operation associated with the instruction 201 or 202. For example, an instruction may be a 32-bit data structure, 6 bits of which designate the opcode and 26 bits of which are for various use depending on the value of the opcode, as depicted in FIG. 2B. For example, in the case of an instruction having an opcode designating an exclusive OR operation, 8 bits of the data structure may designate a mask, 4 bits of the data structure may designate a first register, 4 bits of the data structure may designate a second register and 10 bits of the data structure may be unused. More specifically, the opcode may represent an instruction to the data processor to place the result of an exclusive OR operation using the mask and the contents of the first register as operands into the second register. In this respect, one or more or all of the instructions of the instruction set may comprise data/bits representative of one or more operands 213, 224, 225, and 226 of FIGS. 2A and 2B. In a second sense, as touched upon above, the term "instruction" may designate an instance of a data structure as described above, i.e. data having the given structure. As such, an instruction may be binary data, e.g. 32 bits of data.

The instruction set 200 may comprise an instruction 201 or 202 specifying at least a mask operand 224, a register operand 225 and an immediate value operand 226. In other words, the data processor may be configured to perform processing (e.g. as opposed to simply returning an error) in response to an instruction containing a given opcode, which opcode signifies to the data processor that particular data/bits of the instruction are to be interpreted as a mask operand, a register operand and an immediate value operand, respectively.

The instruction execution circuitry, in response to an instance of such an instruction, may set a respective one of the registers specified by the register operand to a value of the immediate value operand if the Boolean value is true, i.e. the Boolean value has the value "true". For example, the instruction execution circuitry may set the bits of the specified register to be identical to the bits of the immediate value operand, i.e. to the bits contained in the instruction at a location known, by virtue of the data structure associated with the unique opcode contained in that instruction, to be representative of the immediate value operand. The register may be specified by a (binary) value represented by the data/bits in the instruction at a location known, by virtue of the data structure associated with the unique opcode contained in that instruction, to be representative of the register operand. For example, if the bits of the register operand were to be 0 1 1 0 0, this could specify register number 12. Similarly, if the bits of the register operand were to be 0 0 0 1 1, this could specify register number 3. A five (5) bit register operand field is shown in FIG. 2B.

Such an instruction may be termed a "load register on condition immediate" instruction. Such an instruction might specify no more operands than the mask operand, the register operand and the immediate value operand.

The instruction execution circuitry, in response to an instance of such an instruction, may set the respective one of the registers specified by the register operand to zero if the Boolean value is false, i.e. the Boolean value has the value "false". In other words, the instruction execution circuitry may set the register specified by the register operand of the instruction to the value of the immediate value operand if the Boolean value is true and to zero if the Boolean value is false. In this case, such an instruction may be termed a "load register on condition zero or immediate" instruction. Again, such an instruction might specify no more operands than the mask operand, the register operand and the immediate value operand.

Such an instruction may specify another immediate value operand. In other words, the instruction set may comprise an instruction specifying at least a mask operand, a register operand, an immediate value operand and another immediate value operand. The instruction execution circuitry, in response to an instance of such an instruction, may set the respective one of the registers specified by the register operand to a value of the another immediate value operand if the Boolean value is false. In other words, the instruction execution circuitry may set the register specified by the register operand of the instruction to the value of the immediate value operand if the Boolean value is true and to the value of the another immediate value operand if the Boolean value is false. In this case, such an instruction may be termed a "load register on condition immediate or immediate" instruction. Such an instruction might specify no more operands than the mask operand, the register operand, the immediate value operand and the another immediate value operand.

The plurality of registers may comprise at least one status register. In one or more aspects, the term "status register" may be understood as including any meanings associated with the terms "flag register," "condition code register" and "program status word." The status register may store data with regard to a status of the data processor, e.g. a result status of a previous instruction executed by the instruction execution circuitry. The status register may receive such data from the instruction execution circuitry.

The status register may comprise a comparison result flag indicative of the result of a (most recent) comparison performed by the instruction execution circuitry. The comparison result flag may be represented by (a setting of) one or more bits at a given location in the status register.

The status register may comprise a zero flag indicative of whether the result of a (most recent) operation, e.g. an arithmetic operation, a logical operation or a load operation performed by the instruction execution circuitry, was zero. The zero flag may be represented by (a setting of) one or more bits at a given location in the status register.

The status register may comprise a carry flag. The carry flag may be indicative of whether the result of a (most recent) addition operation performed by the instruction execution circuitry yielded a carry. Similarly, the carry flag may be indicative of whether the result of a (most recent) subtraction operation performed by the instruction execution circuitry required a carry/borrow. Likewise, the carry flag may be indicative of whether the result of a (most recent) shift/rotate operation performed by the instruction execution circuitry resulted in a bit being "pushed out." The carry flag may be represented by (a setting of) one or more bits at a given location in the status register.

The status register may comprise a sign flag and/or a negative flag indicative of whether the result of a (most recent) arithmetic operation was negative. Each of the sign flag and/or the negative flag may be represented by (a setting of) one or more bits at a given location in the status register.

The status register may comprise an overflow flag indicative of whether the signed result of a (most recent) arithmetic operation performed by the instruction execution circuitry was too large to fit in the register width using twos complement representation. The overflow flag may be represented by (a setting of) one or more bits at a given location in the status register.

The status register may comprise a parity flag indicative of whether the number of set bits of a result of a (most recent) arithmetic operation performed by the instruction execution circuitry is odd or even. The parity flag may be represented by (a setting of) one or more bits at a given location in the status register.

In cases where the instruction execution circuitry comprises a plurality of execution cores, each execution core may comprise its own respective status register. In this case, the flags/data in a respective status register may be indicative of respective results of a (most recent) operation in the respective execution core. Similarly, one or more or all of the execution cores may share a status register. In this case, the flags/data in a respective status register may be indicative of respective results of a (most recent) operation within the execution cores that share the status register.

As touched upon above, the data processor may moreover comprise a plurality of status registers. For example, the data processor may comprise multiple concurrent status registers that contain results of multiple instructions, e.g. of a corresponding multiplicity of instructions.

The instruction execution circuitry may interpret the register operand as specifying a data register of the plurality of registers. Similarly, the instruction execution circuitry may interpret the register operand as specifying a general purpose register of the plurality of registers. In other words, the register operand may be limited to specifying a data register and/or a general purpose register, i.e. might be prohibited from specifying e.g. a status register and/or an address register of the data processor.

The aforementioned determining of a Boolean value based on a mask operand may comprise setting the Boolean value to a value in the status register specified by the mask operand, e.g. to the value of a bit in the status register specified by the mask operand. For example, the mask operand may be a 3-bit operand, the first bit designating the carry flag, the second bit designating the comparison result flag and the third bit designating the zero flag. If the mask operand has the value 1 0 0 and the carry flag is set to 1, the Boolean value may be set to the value of the carry flag, namely to 1. A three (3) bit mask operand field is shown in FIG. 2B.

Similarly, the aforementioned determining of a Boolean value based on a mask operand may comprise determining whether one or more values stored in the status register are equal to corresponding values in the mask operand. Inter alia, the determining may comprise setting the Boolean value to a value indicative of whether one or more values stored in the status register are equal to corresponding values in the mask operand. For example, the mask operand may again be a 3-bit operand, the first bit designating the carry flag, the second bit designating the overflow flag and the third bit designating the zero flag. If the mask operand has the value 1 0 0 and the carry flag, the overflow flag and the zero flag are respectively set to 1, 0 and 0, then the Boolean value may be set to a value representative of true. Similarly, if the mask operand has the value 1 0 0 and the carry flag, the overflow flag and the zero flag are respectively set to 0, 0 and 1, then the Boolean value may be set to a value representative of false.

As used herein, references to the data processor/instruction execution circuitry "responding" to an instruction may be understood in the sense that the instruction (in the sense of several bits of data) is loaded into an execution register of the data processor/instruction execution circuitry and/or reaches the "front" of an instruction queue of the data processor/instruction execution circuitry and that the data processor/instruction execution circuitry takes action as a result of that instruction. It will be understood that, in cases where the instruction execution circuitry comprises a plurality of execution cores, each execution core may comprise its own respective instruction queue. Similarly, one or more or all of the execution cores may share an instruction core. Similarly, references to the data processor/instruction execution circuitry "responding" to an instruction may be understood in the sense that the data processor/instruction execution circuitry begins processing of the instruction or begins data processing in response to a decoding of the instruction. As touched upon above, execution of an instruction need not be effected in a single step or within a single clock cycle. Instead, execution of an instruction may comprise a plurality of (pipelined) micro-operations. Similarly, processing of an instruction may comprise one or more preparatory actions such as prefetching the instruction from an instruction queue, decoding of the instruction, etc.

While one or more aspects have been discussed hereinabove mainly in the form of a system, one or more aspects may be embodied, mutatis mutandis, in the form of a method, e.g. a method for processing data in a data processor, as will be appreciated by the person skilled in the art. Such a method may comprise any of the actions disclosed hereinabove, which actions need not be tied to a particular apparatus or element.

FIG. 1 schematically shows an embodiment of a data processor 100 in accordance with one or more aspects, e.g. as described above.

In the illustrated embodiment, data processor 100 comprises a plurality of registers 110-118 and instruction execution circuitry 120. The plurality of registers includes a status register 118. Although data processor 100 is shown as comprising nine registers, a data processor in accordance with one or more aspects may comprise any number of registers.

In the following, the advantages and operation of data processor 100 will be discussed in greater detail.

As touched upon above, the status register (containing a so-called Condition Code (CC)) within a processor may contain the result status of a previous machine instruction. For example, loading a value from memory into a register may have the effect to let CC indicate some basic properties of said value like "is negative" or "equals zero". In particular, the CC may also contain the result of comparison operations. Depending on the instruction set architecture, there may be multiple concurrent CCs that contain results of multiple instructions.

A frequently found code pattern in machine programs is subsequent code depending on the value of CC. Such a code pattern may be a branch instruction that, depending on CC, will or will not redirect the flow of control. In many situations, such dependent code loads a register with some values with the intention of using the CC content as an integer or Boolean value. Typical examples include:
1. Functions returning the result of a comparison,
2. Storing the result of a comparison in a Boolean or integer variable (used as "flag"),
3. Splitting complex Boolean expressions into more readable code by storing intermediate results into variables.

Programming languages such as C support this. The C language standard, for example, comprises that the result of a comparison be represented as integer 0 or 1, respectively. Other common representations may use −1, i.e. the bit pattern 111 . . . 111.

Conventional instruction sets use several instructions for either case. In the following, a few code examples will be discussed wherein the machine code was generated using the Linux compiler gcc on System z with code optimization turned on.

Example 1: "Comparing Integer Numbers Using Exclusive OR"

The following C code:

```
int testseven (int fff,
               int qqq)
{
  int res;
  res= (fff == qqq);
  printf ("res= %d \n", res);
  return res;
}
``` stores the result of a comparison between two integer variables into another integer variable. The result is "1" in case the numbers are equal and "0" otherwise. This source code translates into the following machine code:

| testseven: | |
|---|---|
| stmg | %r12,%r15,96(%r15) |
| lr | %r12,%r2 |
| xr | %r12,%r3 |

| testseven: | |
|---|---|
| lpr | %r12,%r12 |
| lay | %r15,−160(%r15) |
| ahi | %r12,−1 |
| larl | %r2,.LC0 |
| srl | %r12,31 |
| lgfr | %r12,%r12 |
| lgr | %r3,%r12 |
| brasl | %r14,printf |
| lgr | %r2,%r12 |
| lg | %r4,272(%r15) |
| lmg | %r12,%r15,256(%r15) |
| br | %r4 |

All machine instructions involved are marked by underlining. The "xr" instruction creates a bitwise exclusive or of the variables "fff" and "qqq," i.e. if the operands are equal, the result will have all bits equal to zero, and if the operands are not equal, the result will have at least one bit not equal to zero. The following "lpr" instruction treats the result as a signed value and transforms the result to its absolute, unsigned value. The transformed result is in the range of 0x00000000 to 0x80000000. To produce the final result, the "ahi" instruction is used to subtract one from the result, transforming 0 to 0xFFFFFFFF and all other numbers to a value in the range of 0x00000000 to 0x7FFFFFFF. Finally, the result is shifted to the right by 31 bits by the "srl" instruction in order to return 1 in case the operands are equal and 0 for all other cases.

Example 2: "Float Compare with Branch"

The following C code:

```
int test6 (double fff, double ggg)
{
  int res;
  res= (fff == ggg);
  printf ("res= %d \n", res);
  return 0;
}
``` compares two floating point numbers and stores the result into an integer variable. The compiler generates the following machine code:

| test6: | |
|---|---|
| stmg | %r14,%r15,112(%r15) |
| aghi | %r15,−160 |
| lhi | %r3,1 |
| larl | %r2,.LC0 |
| cdbr | %f0,%f2 |
| je | .L2 |
| lhi | %r3,0 |

| .L2: | |
|---|---|
| lgfr | %r3,%r3 |
| brasl | %r14,printf |
| lghi | %r2,0 |
| lmg | %r14,%r15,272(%r15) |
| br | %r14 |

Again, any instructions involved in handling the comparison are marked by underlining. The integer value is finally found in register r3 that gets initialized with value 1 by the "lhi" instruction. The comparison is performed by the "cdbr"

instruction. Depending on the result, a subsequent branch instruction "je" causes the processor to skip or not to skip the instruction that overwrites the content of r3 with 0 ("lhi % r3,0").

Example 3: "Float Compare Using INSERT PROGRAM MASK (IPM)"

The next example checks the sign of a floating point value and stores the result into an integer variable:

```
int testfff (double fff)
{
    int res;
    res= signbit (fff);
    printf ("res= %d \n", res);
    return res;
}
```

For this code, the compiler exploits test instruction "tcdb", puts the resulting condition code into a register using instruction "ipm" and finally shifts the inserted bit into the right position:

| testfff: | |
|---|---|
| stmg | %r13,%r15,104(%r15) |
| larl | %r2,.LC0 |
| lay | %r15,−160(%r15) |
| tcdb | %f0,1365 |
| ipm | %r13 |
| srl | %r13,28 |
| lgfr | %r13,%r13 |
| lgr | %r3,%r13 |
| brasl | %r14,printf |
| lgr | %r2,%r13 |
| lmg | %r13,%r15,264(%r15) |
| br | %r14 |

Here this only works for condition code values with exactly one bit set.

Example 4: Using LOAD ON CONDITION

An embodiment of the System z instruction set includes a LOAD ON CONDITION (LOCR) instruction. Its third operand is a value selecting what CC value to check. The first and second operands are numbers denoting two general purpose registers, r1 and r2. Depending on the CC value, the contents of r1 gets or does not get overwritten by the content of r2. A code example may look like this:

LHI 3,0 Load value 0 into GR3
LHI 7,1 Load value 1 into GR7
LOCR 3,7,8 Moves content of GR7 to GR3 if CC=0

As is apparent from the above example, this instruction has the disadvantage of requiring an additional register.

One or more aspects teach a family of load register on condition instructions. This family of instruction includes a LOAD REGISTER ON CONDITION WITH ZERO OR IMMEDIATE (LROCZI) instruction, a LOAD REGISTER ON CONDITION IMMEDIATE instruction, i.e. without zero as default value, and a LOAD REGISTER ON CONDITION IMMEDIATE OR OTHER IMMEDIATE instruction, i.e. with a default value that may differ from zero.

The LOAD REGISTER ON CONDITION WITH ZERO OR IMMEDIATE (LROCZI) instruction has, for instance, the form:

LROCZI mask, reg, immediate_value where mask, also referred to as mask operand, may be a value selecting which CC value to test, reg, also referred to as register operand, may be a number denoting a general purpose register, and immediate_value, also referred to as immediate value operand, may be some integer value.

LROCZI has the semantics to load immediate_value into reg if CC has the value specified in mask; otherwise, value 0 is put into reg. Advantages of this instruction include, for instance:

Essentially all language implementations employ 0 as one of the bit patterns for representing logical values, because testing for 0 has always been simple and cheap. Being flexible with respect to the second value should make the instruction fit everywhere.

Compared to the first three examples above, LROCZI can save several instructions and several cycles execution time.

Compared to using LOAD ON CONDITION (see example 4 above), LROCZI can not only replace three instructions, but can also save one register.

To summarize, this instruction offers several possibilities for performance improvements:

Code gets faster by saving cycles. Using LROCZI replaces several other instructions.

LROCZI can reduce the number of required registers. This has a positive effect on performance in cases where temporary results otherwise had to be stored in memory. An additional free register can also enable additional compiler optimization (in particular, common sub-expression elimination may avoid duplicate calculations but uses one register for keeping the intermediate result).

Code gets shorter. This may cause instruction sequences to fit completely into one cache line. Shorter code may allow the compiler to perform more aggressive loop unrolling.

In some cases, LROCZI replaces branch instructions. This avoids the risk of a performance penalty due to a mispredicted branch.

The following examples exemplify how frequently and in what cases a compiler can make use of the LROCZI instruction.

Resulting Code for previous examples using LROCZI

Example 1

| Code using LROCZI testseven: | | Code without LROCZI testseven: | |
|---|---|---|---|
| stmg | %r12,%r15,96(%r15) | stmg | %r12,%r15,96(%r15) |
| lr | %r12,%r2 | lr | %r12,%r2 |
| xr | %r12,%r3 | xr | %r12,%r3 |
| lroczi | 8,%r12,1 | lpr | %r12,%r12 |
| lay | %r15,−160(%r15) | lay | %r15,−160(%r15) |
| | | ahi | %r12,−1 |
| larl | %r2,.LC0 | larl | %r2,.LC0 |
| | | srl | %r12,31 |
| lgfr | %r12,%r12 | lgfr | %r12,%r12 |
| lgr | %r3,%r12 | lgr | %r3,%r12 |
| brasl | %r14,printf | brasl | %r14,printf |

-continued

| Code using LROCZI testseven: | | Code without LROCZI testseven: | |
|---|---|---|---|
| lgr | %r2,%r12 | lgr | %r2,%r12 |
| lg | r4,272(%r15) | lg | r4,272(%r15) |
| lmg | %r12,%r15,256(%r15) | lmg | %r12,%r15,256(%r15) |
| br | %r4 | br | %r4 |

The code sequence using LROCZI is two instructions shorter than the code without LROCZI.

Figure 2C:
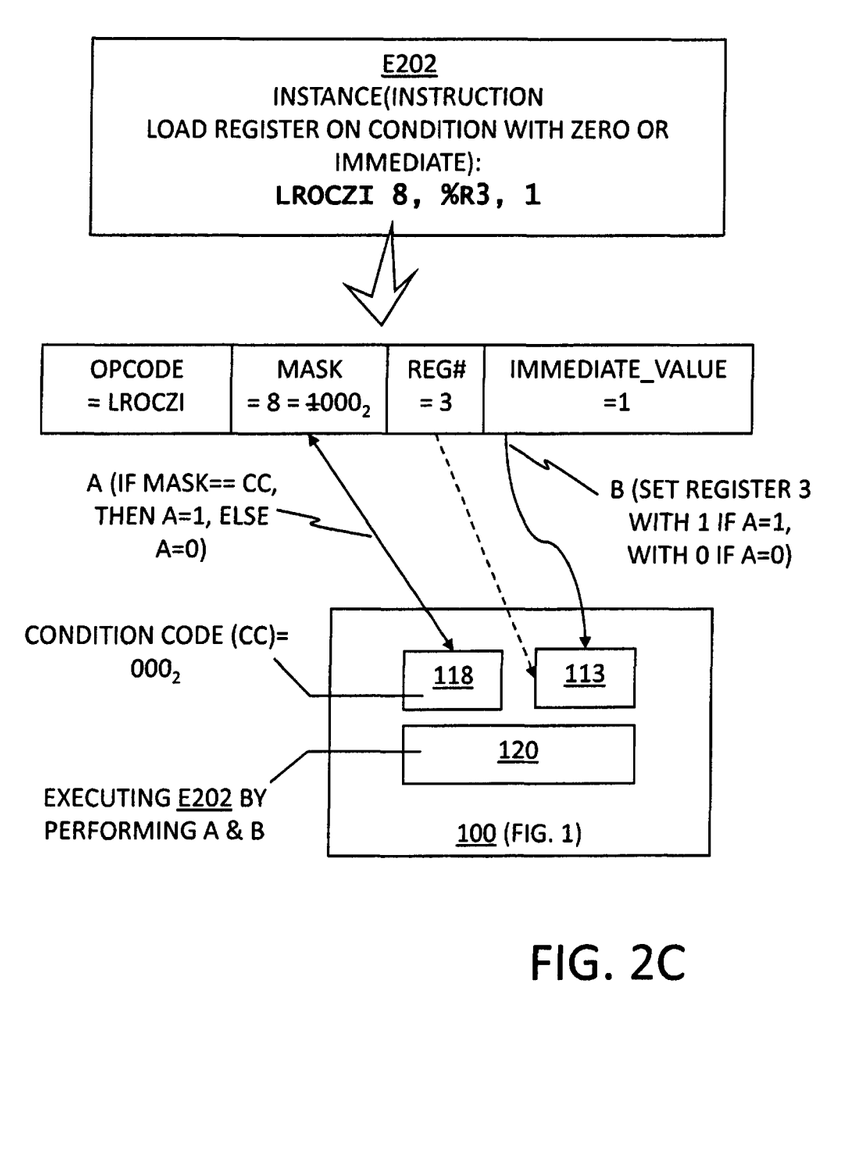
FIG. 2C depicts details of one example of the logic of the instruction of FIG. 2B.

Example 2 is depicted as E202 of FIG. 2C:

| Code using LROCZI | | Code without LROCZI | |
|---|---|---|---|
| test6: | | test6: | |
| stmg | %r14,%r15,112(%r15) | stmg | %r14,%r15,112(%r15) |
| aghi | %r15,-160 | aghi | %r15,-160 |
| | | lhi | %r3,1 |
| larl | %r2,.LC0 | larl | %r2,.LC0 |
| cdbr | %f0,%f2 | cdbr | %f0,%f2 |
| lroczi | 8,%r3,1 | je | .L2 |
| | | lhi | %r3,0 |
| | | | .L2: |
| lgfr | %r3,%r3 | lgfr | %r3,%r3 |
| brasl | %r14,printf | brasl | %r14,printf |
| lghi | %r2,0 | lghi | %r2,0 |
| lmg | %r14,%r15,272(%r15) | lmg | %r14,%r15,272(%r15) |
| br | %r14 | br | %r14 |

The code sequence using LROCZI is two instructions shorter and avoids a conditional branch.

Example 3

| Code using LROCZI testfff: | | Code without LROCZI testfff: | |
|---|---|---|---|
| stmg | %r13,%r15,104(%r15) | stmg | %r13,%r15,104(%r15) |
| larl | %r2,.LC0 | larl | %r2,.LC0 |
| lay | %r15,-160(%r15) | lay | %r15,-160(%r15) |
| tcdb | %f0,1365 | tcdb | %f0,1365 |
| lroczi | 4,%r13,1 | ipm | %r13 |
| | | srl | %r13,28 |
| lgfr | %r13,%r13 | lgfr | %r13,%r13 |
| lgr | %r3,%r13 | lgr | %r3,%r13 |
| brasl | %r14,printf | brasl | %r14,printf |
| lgr | %r2,%r13 | lgr | %r2,%r13 |
| lmg | %r13,%r15,264(%r15) | lmg | %r13,%r15,264(%r15) |
| br | %r14 | br | %r14 |

The code sequence using LROCZI is one instruction shorter.

Example 4 is depicted as E202 of FIG. 2C:

| Code using LROCZI | | | Code without LROCZI | | |
|---|---|---|---|---|---|
| lroczi | 8, 3, 1 | Load value 0 or 1 into GR3 if CC = 0 | lhi | 3, 0 | Load value 0 into GR3 |
| | | | lhi | 7, 1 | Load value 1 into GR7 |
| | | | locr | 3, 7, 8 | Moves content of GR7 to GR3 if CC = 0 |

The code sequence using LROCZI uses two less instructions and one less register.

Frequency and context of LROCZI usage

To get an impression of how LROCZI behaves in practice, the instruction was implemented within the Linux compiler gcc on System z. As expected, the prototype compiler generates the expected assembler code for the first three code examples shown above.

Occurrence in the Linux Kernel:

As a large piece of code relevant to customers, a Linux kernel was compiled using the prototype compiler. The Linux kernel version used was 2.6.16.60-0.42.5, which is the basis for the Linux distribution "Suse Linux Enterprise Server SLES10". The kernel was configured to contain as much code as possible. The loadable binary image had a size of 128 MB.

The binary contained a total of 3494 LROCZIs. This indicates a significant improvement. The Linux kernel has lots of functions returning values in a way such that LROCZI will make this code faster and shorter.

3328 of these LROCZIs are used as a replacement for code patterns that were previously implemented using jumps or doing arithmetic tricks. Another 166 LROCZIs are used to replace IPMs.

Occurrence in SPEC2006 Test Case 401.BZIP2:

The prototype compiler was applied to test case 401.BZIP2 of the SPEC2006 test suite. This test case is used to make official statements of performance of a computer system and thus relevant for this kind of evaluation.

Test case bzip2 has the following hot functions:

| name of function | found in file | number of LROCZIs |
|---|---|---|
| mainSort | blocksort.s | 17 |
| BZ2_decompress | decompress.s | 2 |
| fallbackSort | blocksort.s | 10 |
| mainGtU | blocksort.s | 2 |

As demonstrated by the above table, test case 401.BZIP2 employs a significant number of code situations where LROCZIs can be used to improve efficiency. Accordingly, performance improvements may be expected.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the one or more aspects. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In one or more aspects, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of one or more aspects has been presented for purposes of illustration and description, but is not intended to be exhaustive or limited to the one or more aspects in the form disclosed. Many modifications and variations will be apparent to those of ordinary skill in the art without departing from the scope and spirit of the one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A data processor comprising:
a plurality of registers; and
instruction execution circuitry having an associated instruction set, wherein said instruction set comprises an instruction specifying at least a mask operand, a register operand, and an immediate value operand, and wherein said instruction execution circuitry, based on an instance of said instruction, determines whether a condition code is set to a value indicated in said mask operand and sets a register specified by said register operand of said instance to a value of said immediate value operand based on said condition code being set to the value indicated in said mask operand.

2. The data processor of claim 1, wherein a Boolean value is set based on whether the condition code is set to the value in said mask operand, said Boolean value to be used to set the register based on the Boolean value.

3. The data processor of claim 1, wherein said instruction further specifies an another immediate value operand, and wherein said instruction execution circuitry sets said register specified by said register operand of said instance to a value of said other immediate value operand based on said condition code not being set to the value.

4. The data processor of claim 3, wherein said instruction is a load register on condition immediate or immediate instruction and specifies no more operands than said mask operand, said register operand, said immediate value operand and said other immediate value operand.

5. The data processor of claim 1, wherein said instruction is a load register on condition immediate instruction and specifies no more operands than said mask operand, said register operand and said immediate value operand.

6. A computer program product for processing data in a data processor, the computer program product comprising:
a non-transitory computer readable storage medium readable by a processing circuit and storing instructions for execution by the processing circuit for performing a method comprising:
receiving an instruction specifying at least a mask operand, a register operand, and an immediate value operand;
determining whether a condition code is set to a value indicated in said mask operand; and
setting a register specified by said register operand to a value of said immediate value operand based on said condition code being set to the value indicated in said mask operand.

7. The computer program product of claim 6, wherein said method further comprises setting a Boolean value based on whether the condition code is set to the value in said mask operand, said Boolean value to be used to set the register based on the Boolean value.

8. The computer program product of claim 6, wherein said instruction further specifies an another immediate value operand, and wherein said method further comprises setting said register to a value of said other immediate value operand based on said condition code not being set to the value.

9. The computer program product of claim 8, wherein said instruction is a load register on condition immediate or immediate instruction and specifies no more operands than said mask operand, said register operand, said immediate value operand and said other immediate value operand.

10. The computer program product of claim 6, wherein said instruction is a load register on condition immediate instruction and specifies no more operands than said mask operand, said register operand and said immediate value operand.

11. A method of processing data in a data processor, the method comprising:
receiving an instruction specifying at least a mask operand, a register operand, and an immediate value operand;
determining whether a condition code is set to a value indicated in said mask operand; and
setting a register specified by said register operand to a value of said immediate value operand based on said condition code being set to the value indicated in said mask operand.

12. The method of claim 11, wherein said method further comprises setting a Boolean value based on whether the condition code is set to the value in said mask operand, said Boolean value to be used to set the register based on the Boolean value.

13. The method of claim 11, wherein said instruction further specifies an another immediate value operand, and wherein said method further comprises setting said register to a value of said other immediate value operand based on said condition code not being set to the value.

14. The method of claim 13, wherein said instruction is a load register on condition immediate or immediate instruction and specifies no more operands than said mask operand, said register operand, said immediate value operand and said other immediate value operand.

15. The method of claim 11, wherein said instruction is a load register on condition immediate instruction and specifies no more operands than said mask operand, said register operand and said immediate value operand.

* * * * *